(12) United States Patent
Shoji et al.

(10) Patent No.: US 12,103,031 B2
(45) Date of Patent: Oct. 1, 2024

(54) SEALING ROBOT

(71) Applicant: Kawasaki Jukogyo Kabushiki Kaisha, Kobe (JP)

(72) Inventors: Akira Shoji, Kobe (JP); Kei Watanabe, Kobe (JP); Tadashi Shoji, Kobe (JP); Dai Fukuda, Kobe (JP); Tomoaki Moromasa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 362 days.

(21) Appl. No.: 17/637,075

(22) PCT Filed: Aug. 20, 2020

(86) PCT No.: PCT/JP2020/031440
§ 371 (c)(1),
(2) Date: Feb. 22, 2022

(87) PCT Pub. No.: WO2021/033743
PCT Pub. Date: Feb. 25, 2021

(65) Prior Publication Data
US 2022/0288625 A1    Sep. 15, 2022

(30) Foreign Application Priority Data
Aug. 22, 2019    (JP) .................. 2019-151812

(51) Int. Cl.
*B05C 11/10*    (2006.01)
*B05C 5/02*    (2006.01)
*B25J 9/10*    (2006.01)
*B25J 11/00*    (2006.01)

(52) U.S. Cl.
CPC ........ *B05C 11/1021* (2013.01); *B05C 5/0225* (2013.01); *B25J 9/10* (2013.01); *B25J 11/0075* (2013.01)

(58) Field of Classification Search
CPC ........ B05C 5/0225; B25J 9/10; B25J 11/0075
See application file for complete search history.

(56) References Cited

FOREIGN PATENT DOCUMENTS

| EP | 0266070 A2 | 5/1988 | |
|---|---|---|---|
| JP | 1-184066 A | 7/1989 | |
| JP | 6-269720 A | 9/1994 | |
| JP | H10-211458 A | 8/1998 | |
| WO | WO-2019060920 A1 * | 3/2019 | ............. B05B 12/00 |

* cited by examiner

*Primary Examiner* — Jason Holloway
*Assistant Examiner* — Christopher A Buksa
(74) *Attorney, Agent, or Firm* — XSENSUS LLP

(57) ABSTRACT

Among arbitrary positions on the course of a sealing gun, a position ahead of and separated from the arbitrary position in the moving direction of the sealing gun by a given distance, where an application part falls within a given allowable size in a direction perpendicular to the moving direction on the basis of the sealing gun, is a first position, and a position where the application part is deviated from the allowable size is a second position. A control device corrects the course of the sealing gun that is defined by an operation plan, based on the shape of the application part measured in a measurement point located at the first position.

5 Claims, 7 Drawing Sheets

SEALING ROBOT

CROSS-REFERENCE TO RELATED APPLICATIONS

The present application is based on PCT filing PCT/JP2020/031440, filed Aug. 20, 2020, which claims priority to JP 2019-151812, filed Aug. 22, 2019, the entire contents of each are incorporated herein by reference.

TECHNICAL FIELD

The present disclosure relates to a sealing robot which applies sealing material to an application part of a workpiece.

BACKGROUND ART

Patent Document 1 discloses an application device for viscous material which is applied to a production site of automobiles. This device is provided with a mixing head attached to a robot hand. The mixing head discharges the sealing material while moving along a given route, and applies the sealing material to the application part of a workpiece.

REFERENCE DOCUMENT OF CONVENTIONAL ART

Patent Document

[Patent Document 1] JP1994-269720A

DESCRIPTION OF THE DISCLOSURE

Problem(s) to be Solved by the Disclosure

Even if the workpiece is manufactured or positioned within a tolerable range, the position of the workpiece varies with respect to the robot. The sealing material may be offset from the application part depending on an amount of the positional deviation, even if the robot is moved along the given route. If an applying amount of the sealing material per unit length in the application part is increased so that the sealing material may not be offset, it causes an increase in the product cost.

Therefore, one purpose of the present disclosure is to provide a sealing robot capable of applying sealing material to an application part, while saving an applying amount.

Means for Solving the Problem(s)

A sealing robot according to the present disclosure applies sealing material to an application part of a workpiece extending linearly. The robot includes a pedestal, a robotic arm coupled to the pedestal at a base-end part, a sealing gun attached to a tip-end part of the robotic arm and configured to discharge the sealing material, and a control device configured to control operation of the robotic arm according to a given operation plan defining a course of the sealing gun to move the sealing gun in the extending direction of the application part in a state where the sealing gun opposes to the application part. When, among arbitrary positions on the course of the sealing gun, a position ahead of and separated from the arbitrary position in the moving direction of the sealing gun by a given distance, where the application part falls within a given allowable size in a direction perpendicular to the moving direction on the basis of the sealing gun, is a first position, and a position where the application part is deviated from the allowable size is a second position, the control device corrects the course of the sealing gun that is defined by the operation plan, based on the shape of the application part measured in the measurement point located at the first position.

According to this configuration, during the application work, the shape of the application part is measured ahead of the sealing gun, and the course of the sealing gun is corrected based on the measurement result. Even if the position of the workpiece is offset with respect to the robot, the sealing gun can be maintained to oppose to the application part. The sealing material can be applied to the application part, while saving an applying amount.

The control device corrects the course based on the measurement result by a sensor when the sealing gun is at the "first position" on the course. The "first position" is the position on the course ahead of and separated from the sealing gun by a given distance, where the application part falls within the allowable size in the direction perpendicular to the moving direction on the basis of the sealing gun. Examples of the case of deviating from the allowable size includes a case where an erroneous measurement of the sensor occurs, or a case where the application part is a sudden curved line or includes a bend part at a right angle or an acute angle. The application part may deviate from the scanning range of the sensor at the bend part, and the measurement result may not be obtained. Since the correction is performed when falling within the allowable size, the possible offset of the sealing material from the application part due to the erroneous measurement is suppressed, and it can prevent beforehand that the application part separates from the scanning range of the sensor. The operation load for the correction can be reduced, thereby contributing to the high speed moving of the sealing gun.

Effect of the Disclosure

According to the present disclosure, a sealing robot capable of applying sealing material to an application part, even if an applying amount is saved, can be provided.

MODES FOR CARRYING OUT THE DISCLOSURE

Hereinafter, embodiments will be described with reference to the drawings.

Figure 1:
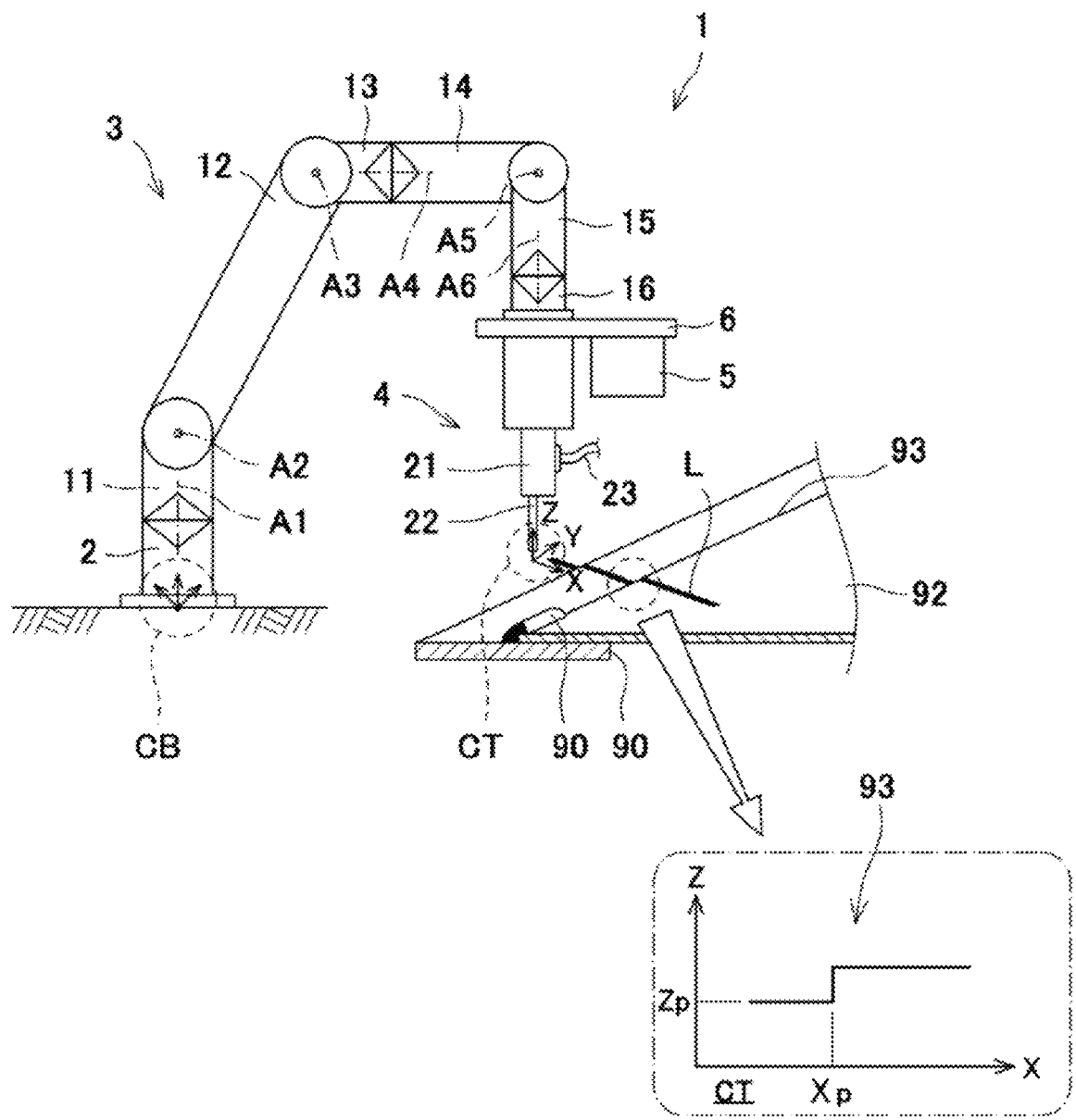
FIG. 1 is a schematic diagram of a sealing robot according to a first embodiment.

FIG. 1 is a schematic diagram of a sealing robot 1 according to a first embodiment. The sealing robot 1 applies sealing material 90 to an application part 93 of workpieces 91 and 92. The sealing robot 1 includes a pedestal 2, a robotic arm 3, a sealing gun 4, and a sensor 5. The pedestal 2 is installed at a production site where an application work is performed. It may be fixed to a floor, a wall, or a ceiling, or may be supported travelable. A base-end part of the robotic arm 3 is coupled to the pedestal 2. The sealing gun 4 is removably mounted to a tip-end part of the robotic arm 3.

The robotic arm 3 is constructed by serially coupling a plurality of link members 11-16 via joints, from the pedestal 2. In this embodiment, the sealing robot 1 is 6-axis robot as one example. The robotic arm 3 includes, as six link members, a swivel table 11, upper and lower arms 12 and 13, and first to third wrist parts 14-16. The swivel table 11 forms the base-end part of the robotic arm 3, and a tip-end part of the third wrist part 16 forms the tip-end part of the robotic arm 3. The swivel table 11 is coupled to the pedestal 2 pivotable on a first axis A1, the lower arm 12 is coupled to the swivel table 11 pivotable on a second axis A2, and the upper arm 13 is coupled to the lower arm 12 pivotable on a third axis A3. The first wrist part 14 is coupled to the upper arm 13 pivotable on a fourth axis A4, the second wrist part 15 is coupled to the first wrist part 14 pivotable on a fifth axis A5, and the third wrist part 16 is coupled to the second wrist part 15 pivotable on a sixth axis A6. In this embodiment, the sealing robot 1 or the robotic arm 3 is of a vertical articulated type as one example. The first axis A1 is perpendicular to a support surface of the pedestal 2, the second axis A2 is perpendicular to the first axis A1, and the third axis A3 is parallel to the second axis A2. The fourth axis A4 is perpendicular to the third axis A3, the fifth axis A5 is perpendicular to the fourth axis A4, and the sixth axis A6 is perpendicular to the fifth axis A5. Note that the number of link members (or joints, pivot axes) is not limited to six. The robotic arm 3 may be of a horizontal articulated type.

The sealing gun 4 is removably attached directly or indirectly to the tip-end part of the robotic arm 3. In this embodiment, a base-end part of the sealing gun 4 is fixed to the front surface of a flat-plate shaped hold member 6, and the back surface of the hold member 6 is attached to the tip-end part of the robotic arm 3. The sealing gun 4 is removably attached to the robotic arm 3 via the hold member 6.

The sealing gun 4 has a reservoir 21 and a nozzle 22. The reservoir 21 is formed in a cylindrical shape and stores the sealing material 90. The nozzle 22 is a narrow-pipe shape, which communicates with the reservoir 21 at a base-end part thereof and opens to the outside at a tip-end part. As one example, the reservoir 21 is connected to a supply source inside the production site (not illustrated) via a hose 23. The nozzle 22 discharges the sealing material 90 stored in the reservoir 21 to the outside. In parallel to the discharging amount of the sealing material 90, the sealing material 90 is supplied to the reservoir 21 from the supply source. A discharge actuator 49 (see FIG. 3) which discharges the sealing material 90 is not limited in particular as long as it is switchable by a control device 7 (see FIG. 3) between an active state (discharging) and a non-active state (not discharging). It may be a pump provided to the supply source, or may be a plunger provided to the reservoir 21.

The sealing material 90 discharged from the nozzle 22 is applied to the application part 93. As one example, the application part 93 is a ply part which is formed by an overlap of the two plate-like workpieces 91 and 92. Roughly, the nozzle 22 opposes to the application part 93 in the plate-thickness direction of the workpieces 91 and 92, and the sealing material 90 is discharged in this opposing direction. A gap at the ply part is closed or filled with the sealing material 90 applied to the application part 93. The first workpiece 91 is located deeper than the second workpiece 92, when seen from the nozzle 22. The application part 93 is comprised of the front surface of the first workpiece 91, the side end face of the second workpiece 92, and the front surface of the second workpiece 92, and extends along the side end face of the second workpiece 92.

Figure 2:
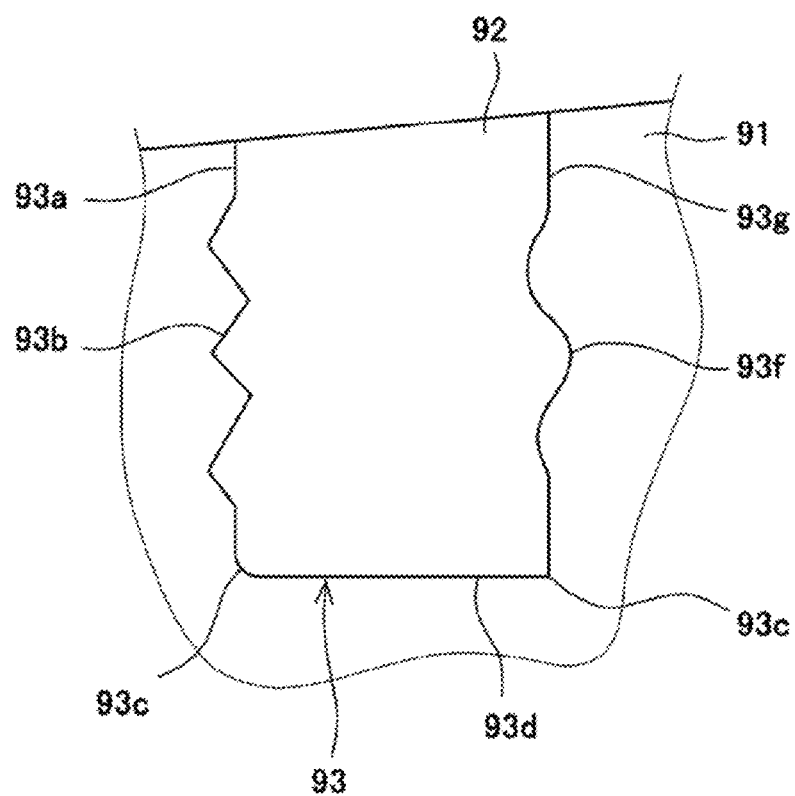
FIG. 2 is a plan view illustrating one example of an application part.

As illustrated in FIG. 2, the application part 93 extends like a line, when seen in the plate-thickness direction of the workpieces 91 and 92. The phrase "like a line" as used herein includes a straight line, a curve, and a combination of these. As illustrated in FIG. 2, the application part 93 includes a first straight line part 93a, a polygonal line part 93b, a sudden curved part 93c, a second straight line part 93d, and a bend part 93e, an S-shaped part 93f, and a third straight line part 93g. These parts 93a-93g continue in this order to form a single line. Note that the application part 93 may be formed with no end.

Returning to FIG. 1, the reference character CB indicates a base coordinate system which sets its origin on the pedestal 2. The reference character CT indicates a tool coordinate system which sets its origin on the sealing gun 4. Although FIG. 1 illustrates a case where the origin in the tool coordinate system CT is set at a tip end of the nozzle 22, it may be set at an arbitrary position on the sealing gun 4 or a part which is not relatively displaced (for example, the hold member 6 or the sensor 5). The origin in the base coordinate system CB is similar.

Figure 3:
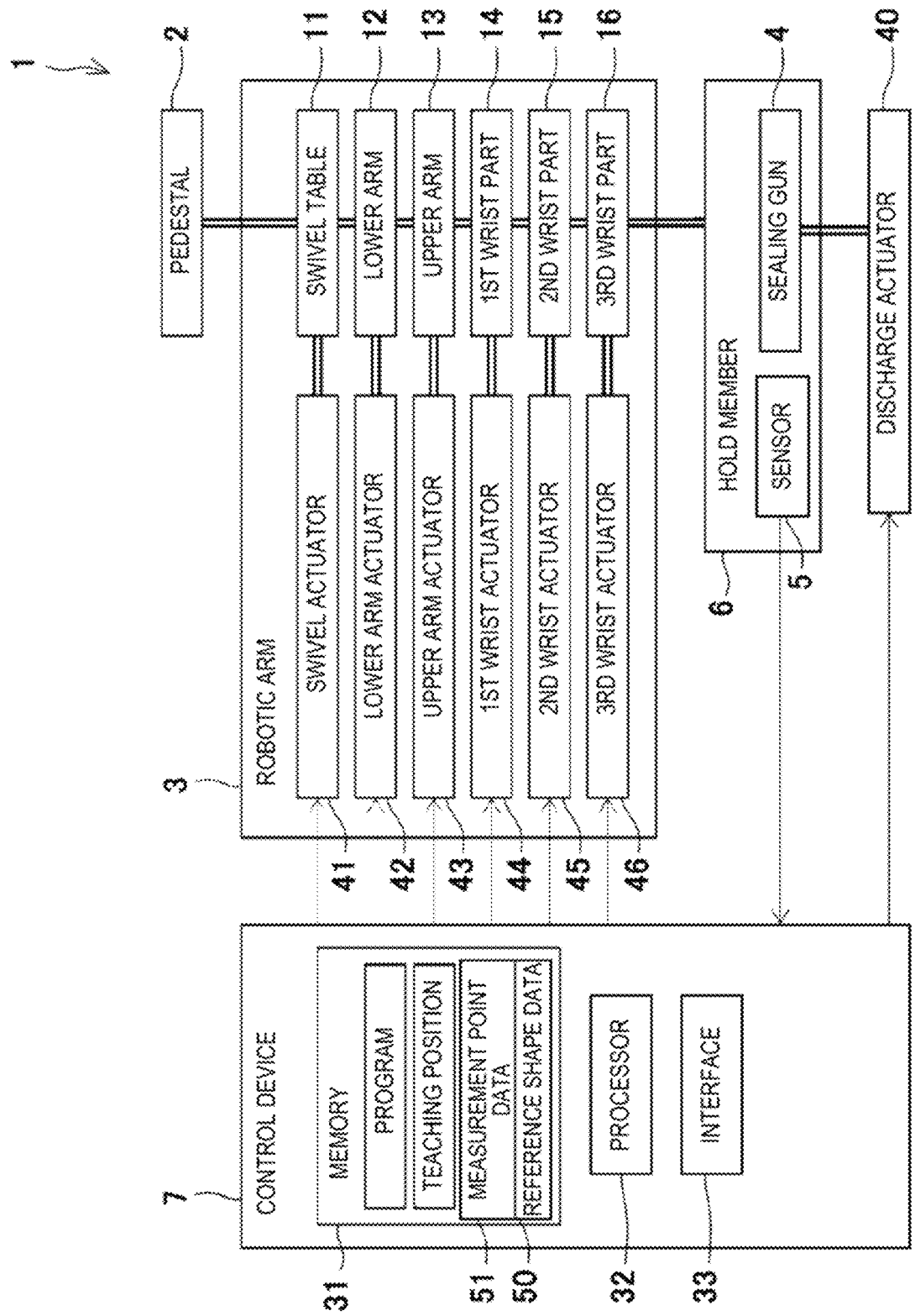
FIG. 3 is a block diagram illustrating a configuration of a sealing robot according to the first embodiment.

The sealing gun 4 moves the sealing gun 4 in the extending direction of the application part 93 in a state where it opposes to the application part 93, by a control of operation of the robotic arm 3 by the control device 7 (see FIG. 3). The course of the sealing gun 4 becomes what imitated the shape of the application part 93 illustrated in FIG. 2 (the shape seen in the plate-thickness direction).

While moving the sealing gun 4 along the course, the sensor 5 measures the shape of the application part 93 ahead of the sealing gun 4 on the course of the sealing gun 4. As one example, the sensor 5 is a laser sensor, which irradiates linear inspection light L to the workpieces 91 and 92, and based on the reflected light, it measures the shape of the application part 93.

The sensor 5 is held together with the sealing gun 4 by the hold member 6, and therefore, it is not relatively displaceable with respect to the sealing gun 4, regardless of the operation of the robotic arm 3. The inspection light L of the sensor 5 is irradiated to a part distant from the sealing gun 4 in one direction of the perpendicular three axes which constitute the tool coordinate system CB (for example, the Y-direction) so that it extends linearly in another direction of the perpendicular three axes which constitute the tool coordinate system CB (for example, the X-direction). Therefore, the inspection light L is irradiated so that it transverses the application part 93 in the direction concerned (for example, the X-direction). The application part 93 includes the polygonal line part and the S-shaped part. Although each of the XYZ components of the course of the sealing gun 4 differs at different parts of the application part 93 in the base coordinate system CB, the Y-axis continues being oriented in the moving direction of the sealing gun 4 in the tool coordinate system CT by the control of operation of the robotic arm 3 (for example, the control of the rotation angle of the third wrist part 16). Therefore, even if the application part 93 winds intricately, the inspection light L can be irradiated ahead of the sealing gun 4 in the moving direction of the sealing gun 4.

Note that the nozzle 22 of the sealing gun 4 extends in another direction of the perpendicular three axes which constitute the tool coordinate system CB (for example, the Z-direction), and the sealing material 90 is discharged in this direction. The discharging direction of the sealing material 90, the opposing direction of the sealing material 90 and the application part 93, and the plate-thickness direction of the workpieces 90 and 91 are all oriented in the direction concerned, and the tip end of the nozzle 22 is maintained at a state where it is separated from the application part 93 in the direction concerned by a given space.

The sensor 5 can measure the cross-sectional shape of the application part 93 at a position where the inspection light L is irradiated based on the reflected light of the inspection light L. This cross section is a vertical cross section with respect to the moving direction of the sealing gun 4. In this example, it is a ZX cross section in the tool coordinate system CT. The shape measured by the sensor 5 is defined as a coordinate value in the tool coordinate system CT. The sensor 5 measures data indicative of the position of the application part 93 in the tool coordinate system CT as the cross-sectional shape of the application part 93. The sensor 5 measures, as the coordinate value in the tool coordinate system CT indicative of the cross-sectional shape, a coordinate value zp of the application part 93 in the Z-direction at the measurement position (corresponding to the nozzle extending direction, the nozzle opposing direction, the sealing material discharging direction, or the workpiece plate-thickness direction), and a coordinate value xp of the application part 93 in the X-direction at the measurement position (corresponding to the direction perpendicular to the extending direction of the application part 93 or to the moving direction of the sealing gun 4).

As roughly illustrated in FIG. 1, the coordinate value xp of the application part 93 in the X-direction is a position of a stepped part of the application part 93, or a position of the side end face of the second workpiece 92 in the X-direction, which is located at the near side when seen from the nozzle 22. Although in FIG. 1 the coordinate value zp of the application part 93 in the Z-direction is illustrated as a z-position of the front surface of the first workpiece 91 which is located at the far side when seen from the nozzle 22, this a mere example. Alternatively or additionally, the sensor 5 may measure the z-position of the front surface of the second workpiece 92, or a difference between the z-positions of the front surfaces of the two workpieces 91 and 92 (the stepped amount in the application part 93). Below, for the convenience of explanation, the illustrated coordinate values zp and xp are acquired.

FIG. 3 is a block diagram illustrating a configuration of the sealing robot 1. The sealing robot 1 is provided with the control device 7 which controls operation of the robotic arm 3 according to a given operation plan which defines the course of the sealing gun 4, and moves the sealing gun 4 in the extending direction of the application part 93 in the state where it opposes to the application part 93. Through this control, an application work for applying the sealing material 90 to the application part 93 in a bead shape is performed.

The control device 7 includes a memory 31 such as a RAM and/or a ROM, a processor 32 such as a CPU, and an interface 33 which is connected to the sensor 5 and various actuators 41-46 and 49. The control device 7 is implemented by a robot controller provided with a computer, such as a microcontroller, for example. The control device 7 may be comprised of a sole control device which carries out a centralized control, or may be comprised of a plurality of control devices which collaboratively carry out a distributed control.

The various actuators include the discharge actuator 49 described above. The various actuators include a plurality of actuators 41-46 which pivot the plurality of links 11-16 which constitute the robotic arm 3, respectively. By operation of these actuators 41-46, the position and the posture of each of the links 11-16 change, and therefore, the sealing gun 4 moves with the sensor 5. These actuators 41-46 are electric motors as one example.

The memory 31 stores information on a basic program as a robot controller, various fixed data, etc. The processor 32 controls operation of the sealing robot 1 by reading and executing software, such as the basic program stored in the memory 31.

The data stored in the memory 31 includes data indicative of a teaching position. The teaching position is acquired as a plurality of points along the shape of the application part 93 at the site of the application work, before performing the application work. The processor 32 generates the operation plan during the application work, based on the teaching position data stored in the memory 31. The operation plan is a set of position data which interpolates between two adjacent teaching positions. The teaching position and the operation plan are defined as coordinate values in the base coordinate system CB, and define the course of the sealing gun 4. Further, as described above, when moving the sealing gun 4 along this course, the posture of the sealing gun 4 is defined by the operation plan so that the nozzle 22 opposes to the application part 93 in the Z-direction of the tool coordinate system CT, and the moving direction of the sealing gun 4 when seen from the current position becomes the Y-direction of the tool coordinate system CT.

In this embodiment, the data stored beforehand in the memory 31 includes measurement point data 51 indicative of a plurality of measurement points which are set on the course of the sealing gun 4, and reference shape data 50 indicative of a reference shape of the application part 93.

Figure 5:
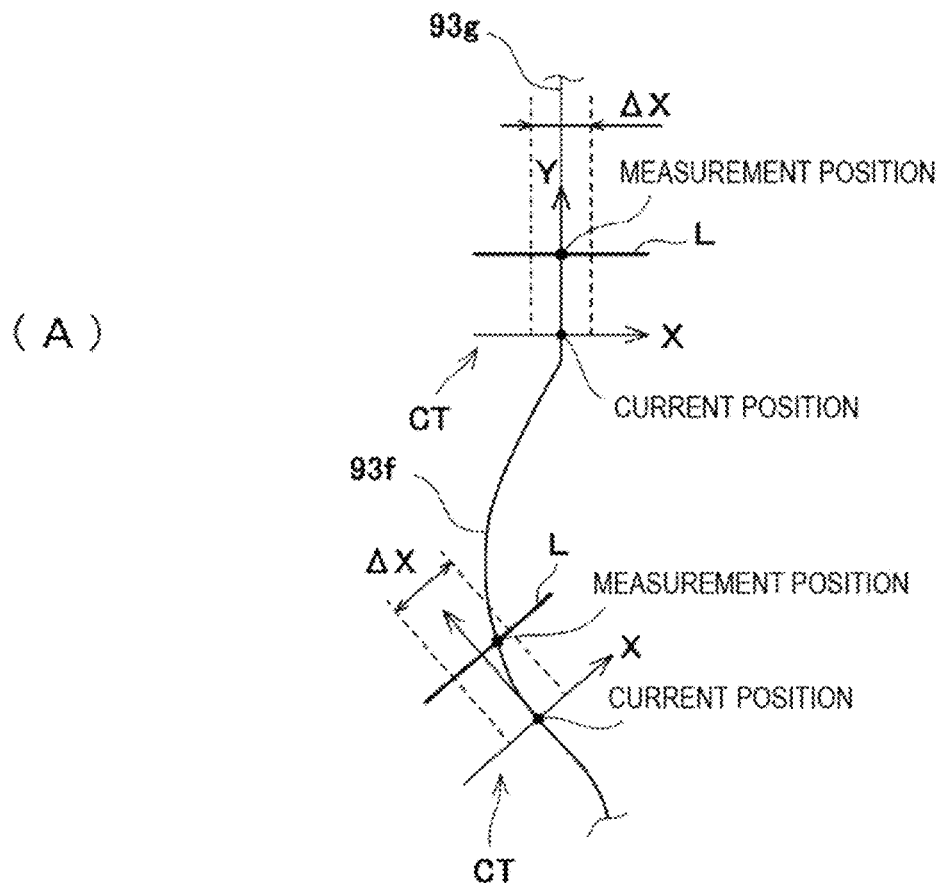
FIGS. 5A and 5B are diagrams of a first position and a second position.
Figure 5:
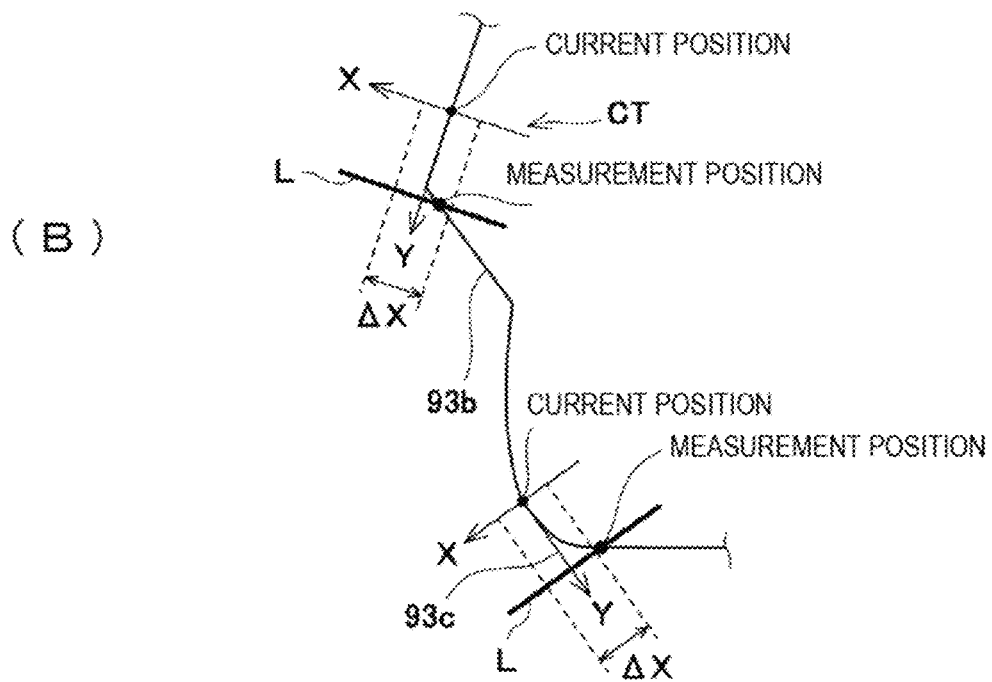

FIGS. 5A and 5B are diagrams of a first position and a second position. As illustrated in FIG. 5A, when the sealing gun 4 is located on the straight line course, the application part at the position where the inspection light L of the sensor 5 is irradiated is originally located at the same position in the X-direction when seen from the position of the sealing gun 4. When it is located on the S-shaped course, the application part at the measurement position is separated in the X-direction when seen from the current position of the sealing gun 4. As illustrated in FIG. 5B, it is similar on the polygonal line part 93b and the sudden curved part 93c. However, since the curvature is larger at the sudden curved part 93c than the S-shaped part 93f, the separated amount in the X-direction from the sealing gun 4 is also larger. At the S-shaped part 93c where the curvature is relatively mild, the application part is fallen within an allowable size $\Delta x$, and at the sudden curved part 93c where the curvature is relatively tight, the application part 93 separates from the allowable size $\Delta x$. Further, at the polygonal line part 93b where the angle formed by the two continuous lines is relatively large, the application part 93 is fallen within the allowable size $\Delta x$, and at the bend part 93e (see FIG. 2) where the angle formed by the two lines is relatively small, the application part 93 separates from the allowable size $\Delta x$.

Here, among arbitrary positions on the course of the sealing gun 4, a position which is ahead of and separated from this arbitrary position in the moving direction of the sealing gun 4, where the application part 93 falls within the given allowable size Δx in the direction perpendicular to the moving direction on the basis of the sealing gun 4, is referred to as a "first position." On the contrary, a position where the application part 93 is separated from the allowable size Δx is referred to as a "second position." In the examples of FIGS. 5A and 5B, all or almost all the positions on the course becomes the first position in the straight line part, the polygonal line part, or the S-shaped part. In the sudden curved part, the bend part, or the part immediately before these part, all or almost all the positions on the course becomes the second position. A plurality of measurement points illustrated by the measurement point data 51 are all set as the first positions in advance.

Note that, even if the sealing gun 4 is located on the straight line course, an erroneous measurement where the measurement result based on the inspection light L does not reflect the actual condition may occur according to the measurement environment and other conditions. When such an erroneous measurement is caused, the application part 93 may be deviated from the allowable size Δx.

Thus, in this embodiment, the plurality of measurement points are selected in advance before performing the application work, and are all set as the first positions. The memory 31 stores a data group indicative of a plurality of the reference shapes corresponding to the plurality of preselected measurement points, respectively. This reference shape is compared with the shape measured by the sensor 5 during the application work. Therefore, the reference shape data 50 is also defined as a coordinate value in the tool coordinate system CT (especially, as the Z coordinate and the X coordinate), similar to the data measurable by the sensor 5. Further, the reference shape corresponding to the measurement point is the shape of the application part at the position which is ahead of and separated from the measurement point at which the sealing gun 4 should be located, by the given distance in the moving direction of the sealing gun 4, and this given distance corresponds to the distance from the sealing gun 4 to the inspection light L.

The reference shape data 50 may be generated by incorporating design data. The reference shape data 50 may be acquired by the actual measurements using the sensor 5 and the sample workpieces 91 and 92, after the generation of the teaching position, before performing the application work. The actual measurement can be performed without being accompanied by the discharging of the sealing material 90. The measurement point may correspond to the first position among the teaching positions, or may be a position between adjacent two teaching positions.

Figure 4:
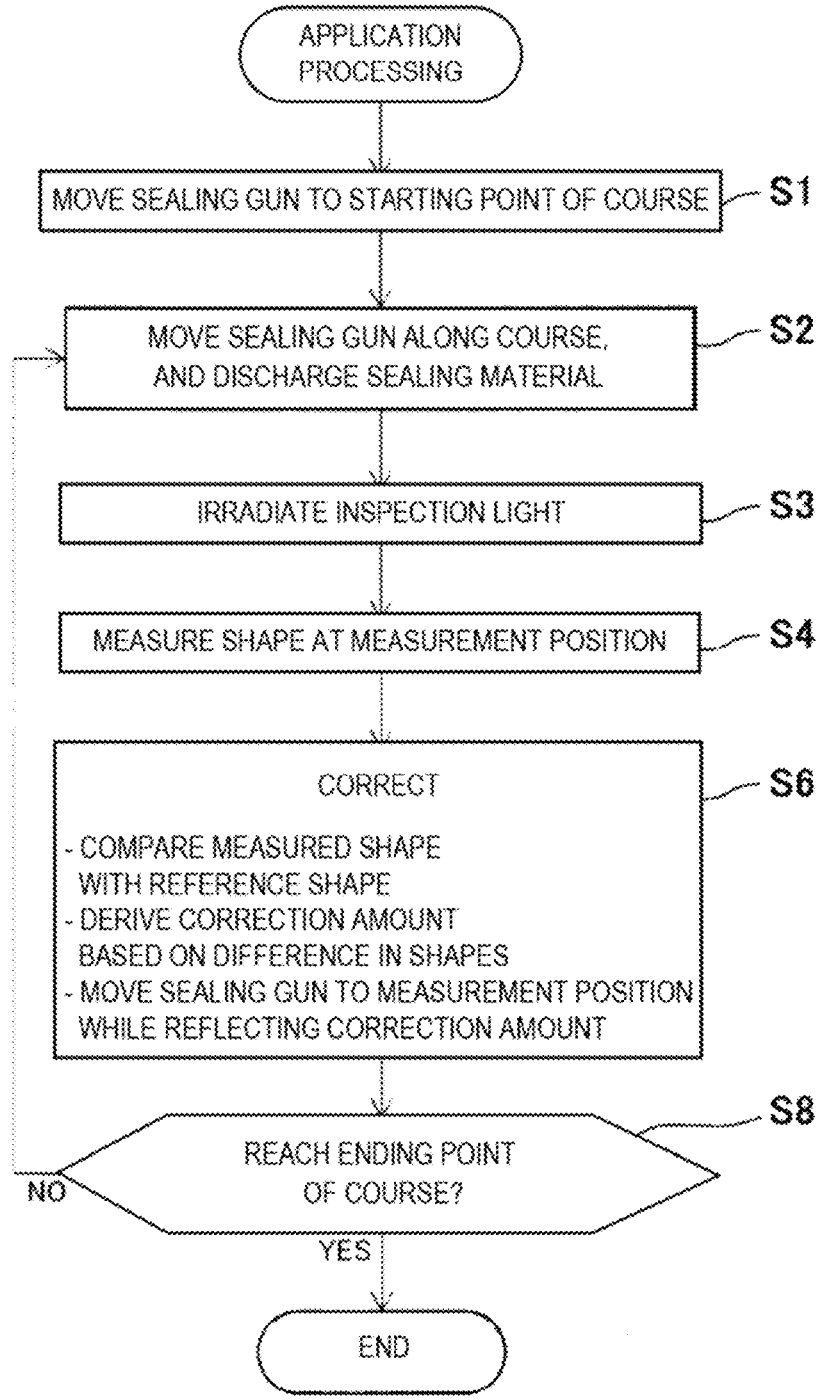
FIG. 4 is a flowchart illustrating application processing according to the first embodiment.

FIG. 4 is a flowchart illustrating one example of the application processing performed by the control device. As illustrated in FIG. 4, first, it operates the robotic arm 3 to move the sealing gun 4 to the starting point of the course (S1). In this example, the sealing gun 4 moves so that the nozzle 22 of the sealing gun 4 opposes to an end of the first straight line part 93a (see FIG. 2).

Next, while controlling operation of the robotic arm 3 to move the sealing gun 4 along the course defined by the operation plan, it controls operation of the discharge actuator 49 to discharge the sealing material 90 toward the application part 93 from the sealing gun 4 (S2). Further, it operates the sensor 5 to irradiate the inspection light L at the position on the course ahead of the current position of the sealing gun 4 (S3). Then, when the sealing gun 4 reaches the measurement point which is set and stored beforehand as described above, it measures the shape of the application part by using the sensor 5 (S4).

Next, based on the result of the measurement at S4, it corrects the course of the sealing gun 4 from the current position of the sealing gun 4 (measurement point) to the position where the shape is measured, which is defined by the operation plan (S6). In this embodiment, the reference shape data 50 is utilized for this correction.

Figure 6:
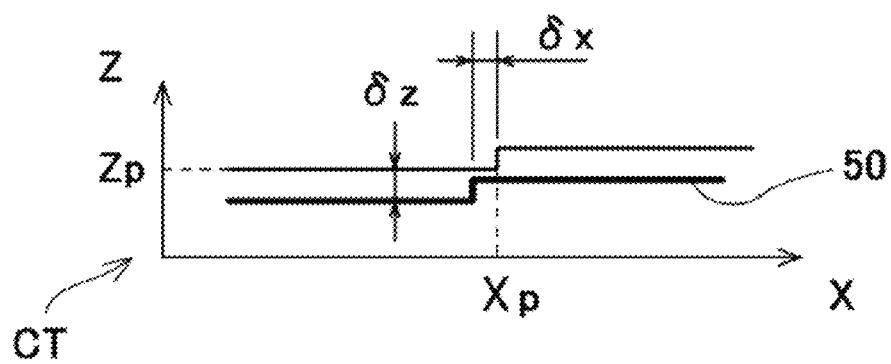
FIG. 6 is a diagram of processing for deriving a correction amount.

As illustrated in FIG. 6, it derives a difference between the shape of the reference shape data 50 and the measured shape as a correction amount. This "shape" is expressed by the Z coordinate and X coordinate in the tool coordinate system as described above. There are two kinds of correction amount, a correction amount δz of a Z-direction component and a correction amount δx of a X-direction component. The correction amount δz of the Z-direction component is derived from a difference between the measured value zp of the Z coordinate and the reference value, and the correction amount δx of the X-direction component is derived from a difference between the measured value xp of the X coordinate and the reference value.

When the sealing gun 4 reaches the position where the shape is measured, the control device 7 corrects the course of the sealing gun 4 so that the sealing gun 4 is located at a position shifted from the originally-defined position by the correction amount δx of the X-direction component in the X-direction and the correction amount δx of the Z-direction component in the Z-direction. Therefore, when the sealing gun 4 reaches the position where the shape is measured, the sealing gun 4 can oppose to the application part 93 with an appropriate interval in the Z-direction, without any shift in the X-direction. For this reason, even if the sealing material 90 is saved in the discharging amount of per unit time, the sealing material 90 can be applied to the application part 93 and the bead width of the sealing material 90 becomes smaller.

While the sealing gun 4 moves (S8: NO), the above-described processing is repeatedly performed. When the sealing gun 4 reaches the ending point of the course (S8: YES), the processing of the application work is finished.

Figure 7:
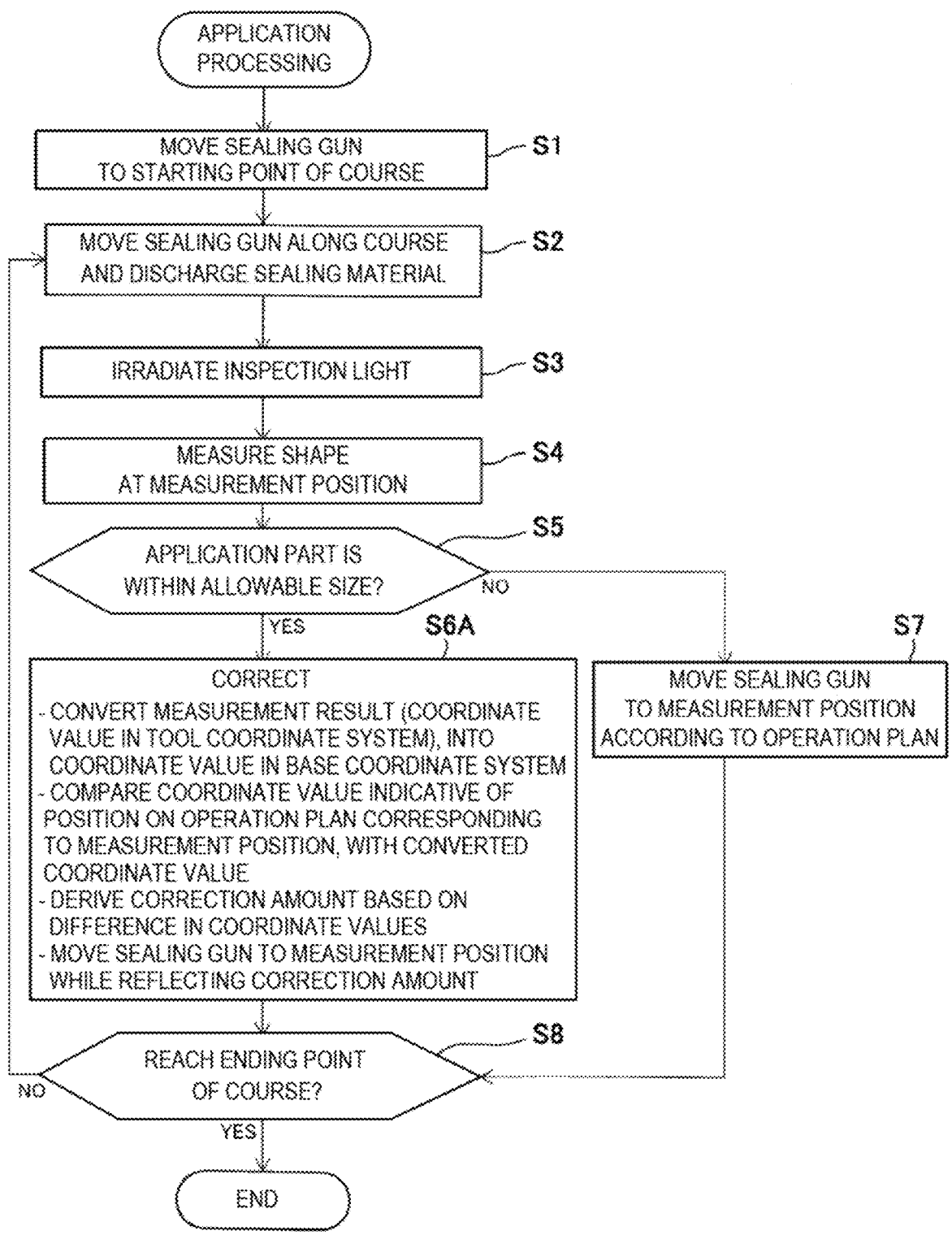
FIG. 7 is a flowchart illustrating application processing according to a second embodiment.

Next, a second embodiment is described. In the second embodiment, the course of the sealing gun 4 is corrected by a technique different from the first embodiment, without requiring the reference shape data. FIG. 7 is a flowchart illustrating the application processing according to the second embodiment.

In this embodiment, a larger number of measurement points is set compared with the first embodiment which requires the reference shape data being stored for every measurement position. Although the measurement points are set according to the respective position data defined by the operation plan as one example, a less number may be set in consideration of operation load etc.

As illustrated in FIG. 7, in this embodiment, with reference to the measurement result at S4, it determines whether the application part at the measurement position concerned falls within the given allowable size δx in the direction perpendicular to the extending direction of the application part, on the basis of the current position of the sealing gun 4 (S5). That is, it determines whether the measurement point is the first position or the second position. In this example, the extending direction of the application part is the Y-direction of the tool coordinate system CT, and the direction perpendicular to this is the X-direction of the tool coordinate system CT. The control device 7 determines whether the application part at the measurement position which is ahead of the sealing gun 4 on the course is separated in the X-direction more than the given amount, when seen from the sealing gun 4.

If it determines that the application part is within the allowable size δx (S5: YES), it then corrects, based on the measurement result at S4, the course of the sealing gun 4 from the current position of the sealing gun 4 (measurement point) to the position where the shape is measured, which is defined by the operation plan (S6A).

At the processing S6A of the correction of this embodiment, it converts the shape data acquired as the coordinate value in the tool coordinate system CT into the coordinate value in the base coordinate system CB. This is because the operation plan is defined by the coordinate value in the base coordinate system CB. Next, it compares the coordinate value indicative of the position on the operation plan corresponding to the position where the shape is measured with the coordinate value acquired by the conversion. A correction amount is derived based on the difference between the coordinate values. The derivation of this correction amount is similar to that of the first embodiment, and the correction amount of the Z-direction component and the correction amount of the X-direction component in the tool coordinate system CT are derived as the correction amounts. The sealing gun 4 is moved to the position where the shape is measured while reflecting the correction amount, similarly to the first embodiment.

If it determines that the application part is out of the allowable size δx (S5: NO), it moves the sealing gun 4 to the position where the shape is measured according to the operation plan defined beforehand, without referring to the measurement result at S5 (S7). At this time, there may be cases where the interval between the sealing gun 4 and the application part 93 becomes large and small in the Z-direction from the appropriate value, or the sealing gun 4 may be deviated in the X-direction from the application part 93 at the measurement position. Therefore, it may control the operation of the discharge actuator 49 to increase the discharging amount of the sealing material 90 per unit time compared with the case when the application part is determined to be within the allowable size δx. Therefore, it can prevent that the sealing material 90 separates from the application part 93.

Also in this embodiment, similarly to the first embodiment, the sealing material 90 can be applied to the applying member 93, while saving the discharging amount of the sealing gun 4. Further, since the correction processing is omitted in the large curvature part where the application part is deviated from the tolerable range, the operation load can be reduced, thereby contributing to an improvement in the moving speed of the sealing gun 4.

Although the embodiments are described above, the above configuration is one example, and it may be changed, deleted, and/or added suitably within the scope of the present disclosure.

The invention claimed is:

1. A sealing robot configured to apply sealing material to an application part of a workpiece extending linearly, the sealing robot comprising:
   a pedestal;
   a robotic arm coupled to the pedestal at a base-end part;
   a sealing gun attached to a tip-end part of the robotic arm and configured to discharge the sealing material;
   control circuitry configured to control operation of the robotic arm according to a given operation plan defining a course of the sealing gun to move the sealing gun in the extending direction of the application part in a state where the sealing gun opposes to the application part; and
   a sensor configured to measure, when the sealing gun is located at each of a plurality of measurement points set on the course, the shape of the application part ahead of the measurement point in the moving direction of the sealing gun,
   wherein when, among arbitrary positions on the course of the sealing gun, a position ahead of and separated from the arbitrary position in the moving direction of the sealing gun by a given distance, where the application part falls within a given allowable size in a direction perpendicular to the moving direction on the basis of the sealing gun, is a first position, and a position where the application part is deviated from the allowable size is a second position, the control circuitry corrects the course of the sealing gun that is defined by the operation plan, based on the shape of the application part measured in the measurement point located at the first position,
   wherein the sensor is attached to the sealing gun,
   wherein the shape of the application part measured by the sensor is defined by a coordinate value of a tool coordinate system where the origin is set at the sealing gun,
   wherein the operation plan is defined by a coordinate value of a base coordinate system where the origin is set at the pedestal, and
   wherein the control circuitry is further configured to:
     determine whether the measurement point is the first position or the second position, based on the measurement result of the sensor;
     when the control circuitry has determined that the measurement point is the first position, convert a coordinate value indicative of the shape of the application part measured at the measurement point into a coordinate value of the base coordinate system, compare the converted coordinate value with the coordinate value defined as the operation plan, and correct the course of the sealing gun based on a difference between the coordinate values; and
     when the control circuitry has determined that the measurement point is the second position, control operation to move the sealing gun according to the operation plan.

2. The sealing robot of claim 1, wherein the control circuitry includes a memory configured to store measurement point data indicative of the plurality of measurement points set as the first positions, and reference shape data indicative of reference shapes of the application parts corresponding to the plurality of measurement points, respectively, and
   wherein the control circuitry compares the shape of the application part measured at the measurement point with the reference shape corresponding to the measurement point, and corrects the course of the sealing gun based on a difference between the shapes.

3. The sealing robot of claim 1, wherein when the control circuitry has determined that the measurement point is the second position, the control circuitry increases a discharging amount of the sealing material from the sealing gun compared with when determined that the measurement point is the first position.

4. The sealing robot of claim 1, wherein the application part is a ply part formed by an overlap of two plate-like workpieces, and wherein the sensor measures, as parameters indicative of the shape of the application part, the position of the application part in a plate-thickness direction of the workpiece, and the position of the application part in the direction perpendicular to the moving direction.

5. The sealing robot of claim 4, wherein the sensor is a laser sensor configured to irradiate laser light to the workpiece so that the laser light transverses the application part in the direction perpendicular to the moving direction.

* * * * *